Feb. 16, 1932.  J. McCREATH  1,845,925
INDICATING DEVICE FOR VEHICLES
Filed April 29, 1925   4 Sheets-Sheet 1

Inventor:-
James McCreath.
By Sturtevant & Mason
Attorneys

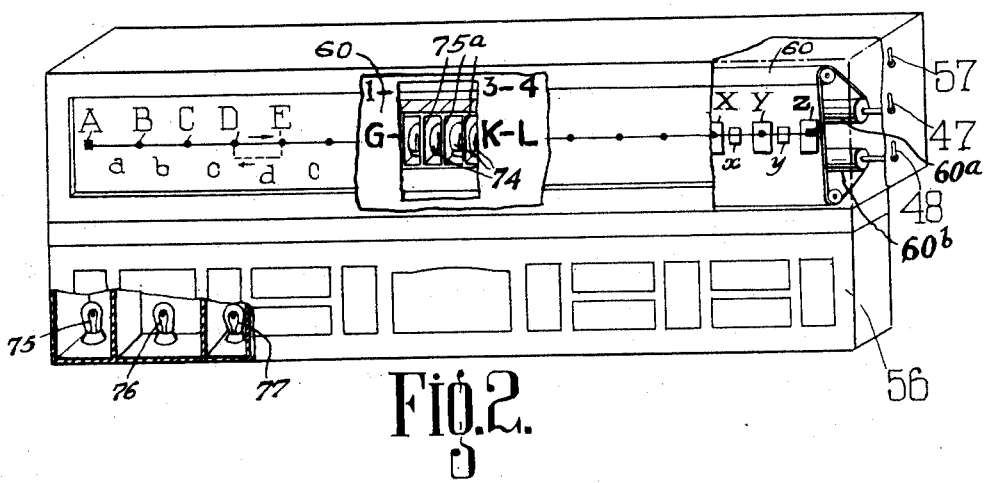
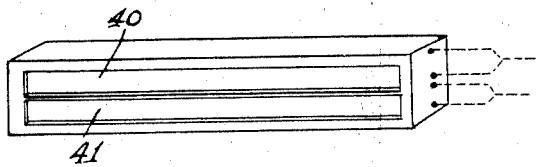

Feb. 16, 1932.  J. McCREATH  1,845,925
INDICATING DEVICE FOR VEHICLES
Filed April 29, 1925  4 Sheets-Sheet 3
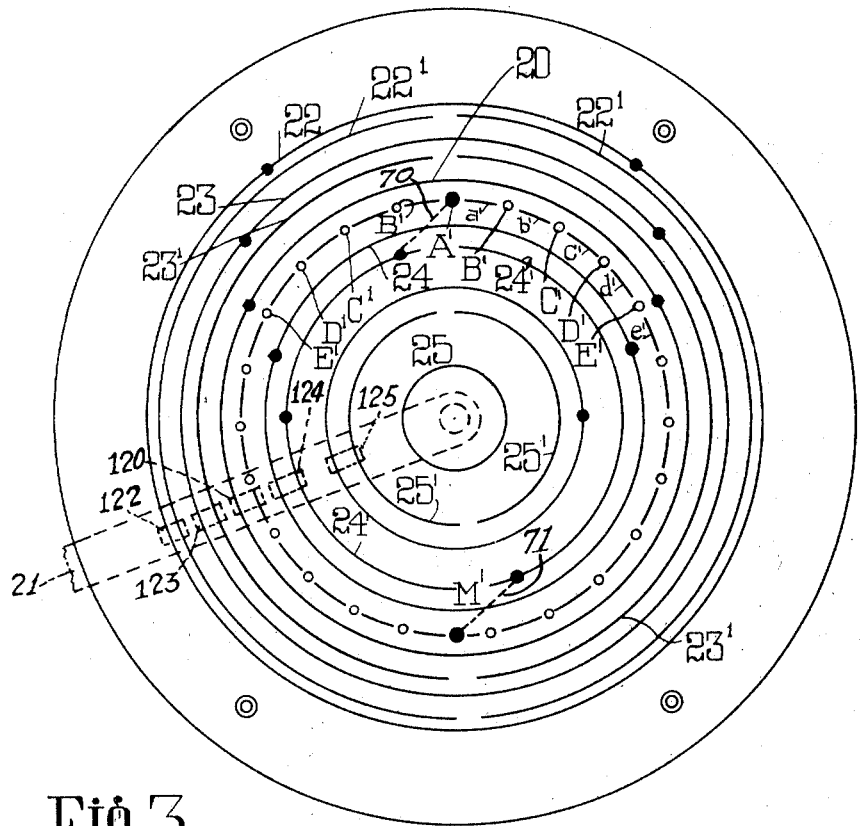
Fig.3.
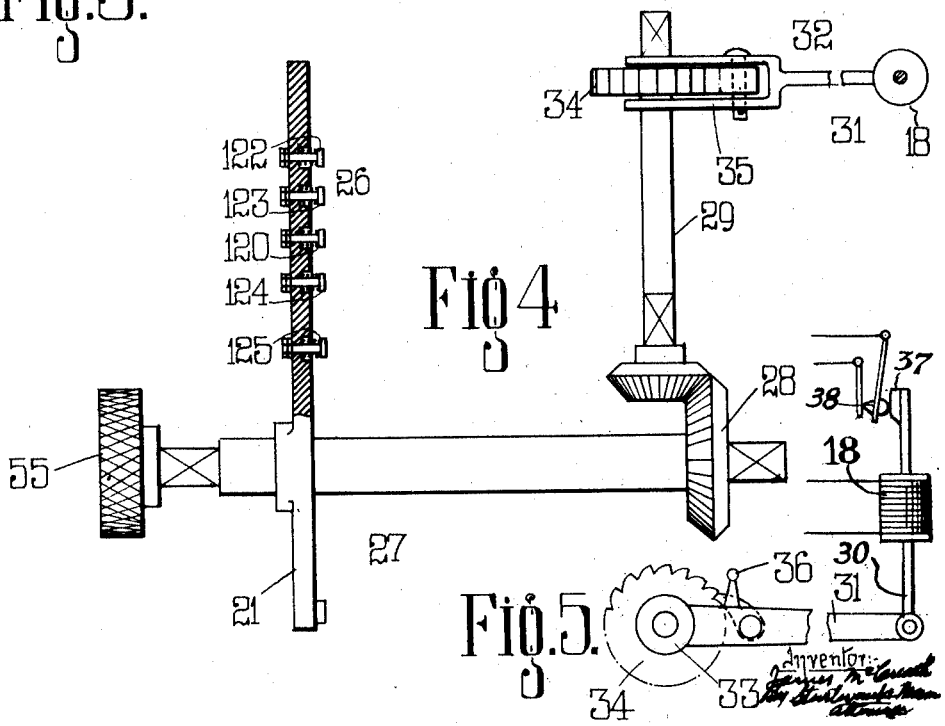
Fig.4.
Fig.5.

Feb. 16, 1932.    J. McCREATH    1,845,925
INDICATING DEVICE FOR VEHICLES
Filed April 29, 1925    4 Sheets-Sheet 4
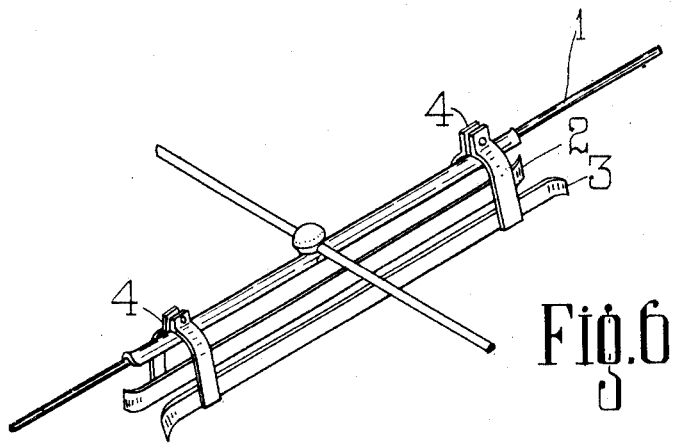
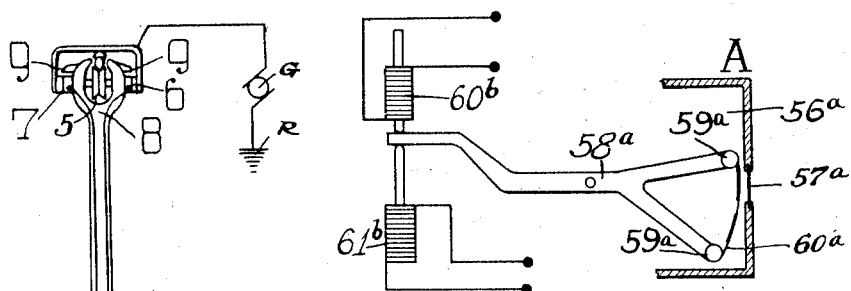
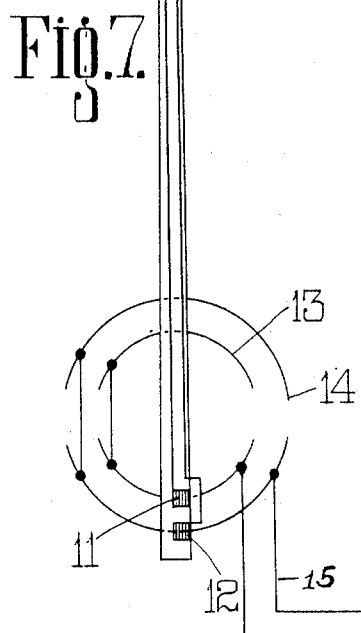
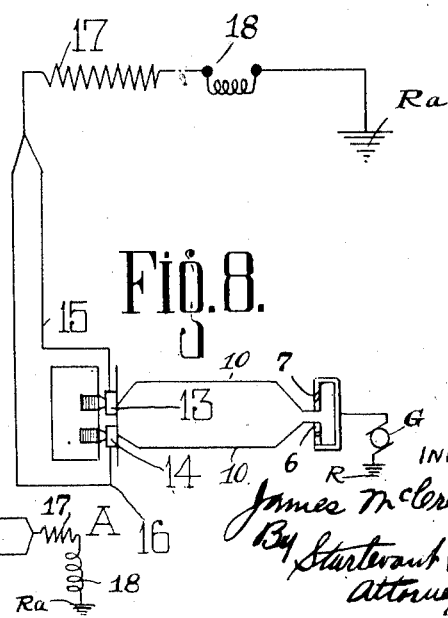
INVENTOR.
James McCreath
By Sturtevant & Mason
Attorneys Patented Feb. 16, 1932

1,845,925

UNITED STATES PATENT OFFICE

JAMES McCREATH, OF LIVERPOOL, ENGLAND

INDICATING DEVICE FOR VEHICLES

Application filed April 29, 1925, Serial No. 26,704, and in Great Britain April 29, 1924.

This invention relates to indicating devices for vehicles.

One object of this invention is to provide a method of and apparatus for giving any required indication automatically on a vehicle of any type operating by electric traction.

A further object of the invention is to provide on a vehicle electrically driven from a source of supply an indicating device operated automatically on the making or breaking or neutralization of current derived from said source.

A further object is to construct a device wherein the operation of a plurality of indicating devices is effected in succession from the tractive source by a switch actuated automatically by the making or breaking or neutralization of current derived from said source.

This indication may be given to passengers outside the vehicle, to the driver or guard, or to approaching or following vehicles.

The indication given may comprise the route to be followed by the vehicle, the position of the vehicle at any moment, the destination of the vehicle and the usual warning lights to other vehicles, the said indication being such as to change automatically on the direction of travel of the vehicle being reversed.

The apparatus is applicable to any type of vehicle operated by electric traction such as tramcars, trains or the like.

The invention is more particularly described with reference to the accompanying drawings, wherein it is shown as applied to the actuation of a series of indicating devices for use on tramcars, but it will be appreciated that it can equally well be applied to electric railcars driven under ground or otherwise.

In these drawings:—

Figure 2 shows a form of route indicator.

Figure 3 shows a slightly modified form of switch dial.

Figures 4 and 5 show a device for moving the switch arm.

Figure 6 is a perspective view of a device for picking up current from the line.

Figures 7 and 8 show diagrammatically a trolley contact and its connections with the apparatus.

Figures 9 and 10 show a perspective and partial sectional view of an outside destination indicator.

Figure 1:
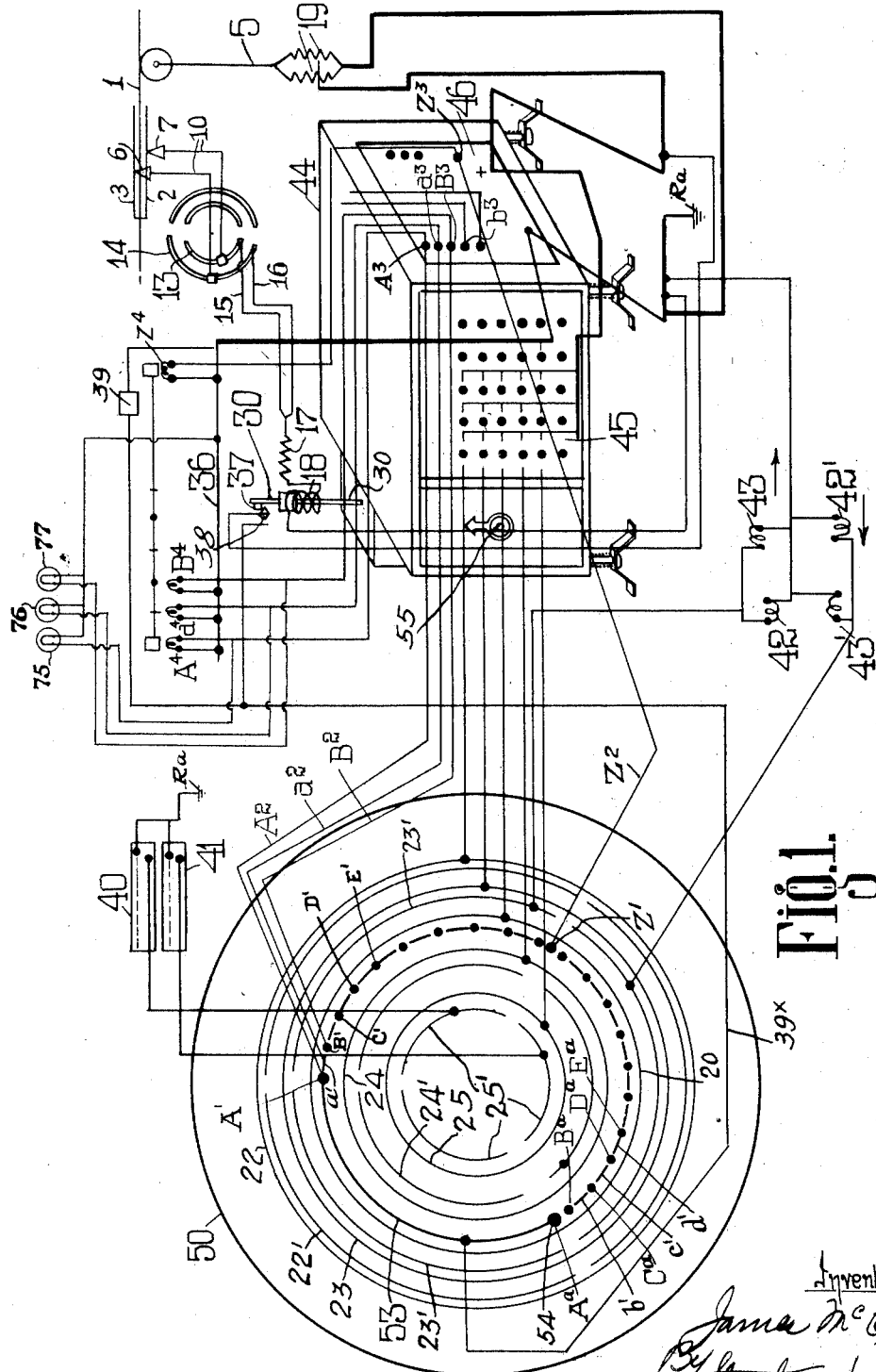
Figure 1 is a diagrammatic representation of the apparatus including the electrical connection.

In the form of construction illustrated there is shown a route indicator, an outside destination indicator, means for automatically varying the destinations on the completion of a journey and means for varying the vehicle lights such as for example the white leading light and the red rear light.

Referring to Figures 6–8, in Fig. 6 is shown a device for picking up current from the supply main 1 which comprises a pair of spring contact members 2, 3, supported by suitable lugs 4 from the main trolley wire 1, which is connected to a generator G and thence to the ground return R as is usual for overhead trolley systems. It will be noted that the ends of the contact members 2, 3, are preferably outwardly flanged in order to allow the easy entrance of the trolley. As shown in Fig. 7 the trolley is provided in addition to the normal contact wheel 5 with side contacts 6, 7, which are normally insulated from the trolley head 8. These contacts may be of any desired form and it is unnecessary that they should project much beyond the outer surface of the trolley head 8. If necessary protective ears 9 may be arranged above the contacts 6, 7 to prevent accidental contact of the said contacts 6, 7, with the main trolley wire 1 when such contact is undesired.

The contacts 6, 7 are connected by insulated conducting lines 10 to spring pressed contacts 11, 12, mounted at the base of the trolley and adapted to contact with conductive rings 13, 14, as shown more particularly in Fig. 8. From the rings 13, 14, leads 15, 16, are taken which pass through a suitable resistance 17 and are connected to one terminal of a suitable solenoid 18 as will be hereinafter described whence the line passes to earth or suitable rail Ra. In this manner current is drawn from the main trolley wire 1 and the voltage necessary for operating the solenoid 18 is stepped down by the provision of the resistance 17, or transformers and/or condensers in A. C. systems.

The circuit connections are shown diagrammatically in Fig. 1 whence it will be noted that the trolley line 5 is provided with a resistance 19 in parallel with the usual motor operating circuit whence a convenient tap is taken to provide a suitable voltage for operating the indicating devices, for example, a voltage of 12 volts would be sufficient. It is therefore apparent that the line current has been led along two separate paths, firstly along a circuit adapted to operate a solenoid 18 or like device and secondly along a path which is adapted to provide a voltage sufficient to operate indicating devices.

Referring to Fig. 2, a route indicating device is shown which comprises a plurality of stations A, B, C, D ........ G .. K, L .... X, Y, Z, between which is a route line $a, b, c, d, e$ ......... $x, y$. The route indicator includes a screen 60 having indications such as G, K, L thereon for individual illumination by the lamps 74, between which are marks which, when illuminated by the corresponding lamps, show that the car is in transit between stations. The web 60 may have a number of such route indicators thereon, and in Fig. 2, the indicators 1 ... 3, 4 .... are shown as a second series for indicating a different route over which the car may pass. The lamps behind the separate stations and lines are adapted to be illuminated successively as the vehicle passes along the route and this is effected by means of a switch provided with a plurality of contacts according to the number of stations and lines and shown more particularly in Fig. 3. The switch dial shown in Fig. 3 comprises a plurality of concentric circularly arranged contacts. Dealing firstly with the contacts adapted for the indication of the route indicator shown in Fig. 2 the switch comprises a plurality of contacts A'. B'. C'. D'. E'. ........ in the light circuits for the stations and a further plurality of contacts $a', b', c', d', e'$ ...... in the light circuits for the lines while arranged immediately adjacent the said contacts is a further continuous contact ring 20. The switch is provided with an arm 21 shown more particularly in Figures 4 and 5 which is adapted to be rotated by the operation of the solenoid 18 shown diagrammatically in Fig. 5. For each separate ring of contacts 22, 23, 20, 24, 25, mounted on the switch dial there is arranged a corresponding contact on the arm 21 as indicated by 122, 123, 120, 124, 125, the contacts being preferably provided with springs 26 forcing the contact members on to the circularly arranged contacts to bridge the pairs of rings the purpose of which circularly arranged contacts will be described in full later. The arm 21 is mounted on a spindle 27 which is provided with suitable gearing 28 with a further spindle 29 adapted to be rotated in a step by step manner by the operation of the solenoid 18. Any suitable connection of links, levers or other transmission members may be provided between the plunger rod 30 of the solenoid 18 and the spindle 29. In the drawings there is shown a lever 31 connected to the plunger rod 30 and provided there-on with a pawl 32 the said lever 31 pivoting about the centre 33 of a ratchet wheel 34 rigidly secured to the spindle 29. On the actuation of the solenoid 18 the plunger 30 is moved upwards thereby carrying the lever 31 in an upward direction about its pivotal point 33 and causing the pawl 32 to move the ratchet wheel 34 through a predetermined arc. Preferably a guard member 35 is provided to ensure the pawl 32 being maintained in contact with the teeth of the ratchet wheel 34. It will be appreciated therefore that on each operation of the solenoid 18 the spindle 27 and arm 21 are moved through a predetermined arc to move from one contact, for example A' to the next contact $a'$.

The circular ring contact 20 comprises a common source which is connected through a route selector and which is fixed, as will be hereinafter described to the positive terminal of the indicating voltage supply. Each individual contact $A', a', B', b'$ ....... is connected by lines $A^2, a^2, B^2, b^2$ ..... to the terminals $A^3, a^3, B^3, b^3$ ...... of a test box and thence to its respective lamp $A^4, a^4, B^4, b^4$ ...... arranged within the route indicating box behind the separate station or line indications A, a, B, b ... the opposite pole of the lamp being connected to a common line 36 which is connected to earth, or negative return. In Fig. 2 only one set of lamps 74 are shown in order to simplify the drawings but both sets of lamps $A_4, B_4$ ... and $a_4, b_4$ .. are contained in the casing shown in Fig. 2. The lamps $A_4, B_4$ .. are identical with the lamp 74 and indicate the stopping places; the lamps $a_4, b_4$ ... indicate the portions of the route intermediate the stops. Other lamps 75, 76, 77 wired in parallel with the lamps $A_4, B_4$ ... and/or $a_4, b_4$ .. are used to illuminate signs or advertisements arranged in the lower part of the casing shown in Fig. 2.

Mounted in or adjacent the box containing the route diagram is an audible signal of any desired type, for example a buzzer, which is actuated automatically on the operation of the solenoid 18. Referring to Fig. 1 it will be seen that the solenoid plunger 30 is formed with a cam face 37 adapted to actuate a spring contact 38 to close a circuit through a buzzer or the like 39 so that an audible signal is also given at each operation of the solenoid.

In order to allow continuous rotation of the arm 21 for out and home journeys the contacts A', B', C' as shown in Fig. 3 .... are duplicated in one complete circle so that one complete rotation of the arm suffices for out and home journeys. That is, in the form of construction shown in Fig. 3, where the arm 21 is assumed to move intermittently in a clockwise direction, the movement of this arm from closed position with respect to contact a' to the position diametrically opposite will represent a complete "out" journey for this half revolution: while the movement of the arm 21 from this latter position back to position opposite contact a' will represent the "home" journey, constituting the other half of the revolution. Further in order to maintain the destination indicating lamp alight throughout the journey on the route diagram a second pair of rings is utilized as shown on the drawings by 24, 24', the latter being split at the points of completion of one journey and connections made from the contacts M' or A' to the respective parts of the ring 24' as shown by connections 70, 71 Fig. 3 so that the lamp connected to these terminals is maintained illuminated throughout the journey. Thus for example prior to the start of a journey the lamp of each terminus is illuminated, the lamp of the terminus where the car is then located by means of the contact A' or M' and the lamp of the distant terminus by virtue of the ring 24'.

The connections of the pairs of rings of contacts on the dial of Fig. 3 are arranged in a manner similar to the corresponding ones of Fig. 1.

On the outward side of the route diagram box is arranged a separate destination indicator comprising two windows 40, 41 one of which is adapted to be illuminated at a time and to change automatically when the direction of travel of the vehicle is reversed. This is controlled from the ring of contacts 25 which comprises an outer ring 25 and an inner ring 25' the latter being split and having its respective portions connected to lamps illuminating the windows 40, 41. As will be apparent from Fig. 3, the destination indicator will be changed at the break of the inner ring 25' which is arranged at that point of the circle where the arm rests immediately prior to the completion of each journey out and home.

Similarly the signal lights normally carried by the vehicle which must be changed on completion of a single journey prior to reversal are controlled from the pair of rings 23, 23' the latter being split as above mentioned where necessary and illuminating the white headlight 43 and red tail light 42 on one journey and the white headlight 43' and red tail light 42' on the return journey. The outer pair of rings 22, 22', may be utilized for any desired purpose for example on a tram car the guard may signal to the driver by an electric bell or the like the respective bells at opposite ends of the car being connected to the split parts of the ring 22'.

It is desired as far as possible to enclose completely all connections and in order to facilitate the assembly of the apparatus the switch with solenoid 18, selectors 45 and test box 46 are mounted in a casing 44 (Fig. 1) the wiring for the lamps on the route diagram and the like being brought to the test box terminals as shown and the connections to the switch contacts being brought also to the corresponding terminals. Similarly the positive and negative leads of the supply are connected to the test box. It may be necessary with tram cars, trains or the like to move the vehicle from one route to another. To provide for this the route indicating diagram must be varied which is effected by setting up several routes on a screen or blind and adjusting the blind 60 manually into the indicating position by any suitable transmission mechanism. Similarly the destination indicator seen from the outside through windows 40, 41 may be formed as screens adapted to be wound up on spools in the ordinary manner. This screen 60 may be taken up on the rollers 60a, 60b by operation of the handles 47, 48. By movement of the screen, various route indicia may be moved into position opposite the lamps 74.

In some cases when the route is changed the number of stations or stops will differ in which case provision must be made for alteration of the switch or other parts of the apparatus. If there is only a small difference in said number the adjustment may be effected by manipulation of the connection of the switch contacts and lamps respectively at the test box and by the addition of further current collectors, 2, 3, which step the switch arm 21 round the dial without altering the indication on the route diagram.

If however, there is a large difference, transference from one route to another may necessitate the additional provision of a modified switch dial 50 as shown in Fig. 1 on the switch spindle 27 wherein part of the dial is inoperative for controlling different route indications, and one double journey out and home is covered by the contacts A', Z' and A*a*. To ensure that at the commencement of each out journey the switch arm 21 starts from the contact A', a contact bar 53 provided between A*a* and terminating just prior to contact A' is connected to the audible signal device 39 so that when the double journey is completed the arm on reaching contact A*a* closes the audible signal circuit and the signal rings until the arm is returned manually to contact A' by means of a knob 55 mounted on the spindle 27 and allowing the same to be rotated. This knob 55 also allows the switch arm to be manually adjusted in the case where the vehicle does not complete the journey or where a fault arises in the electrical circuit.

Further a lever 57 is provided at the side of the route indicator box with suitable transmission to adjust the spindle 27 of the switch arm 21, the casing 44 being preferably arranged under the seat adjacent the route indicator.

The selectors 45 are provided to allow minor modifications to be made in the case where a plurality of routes are used with the same switch spindle which is then provided with a plurality of switch arms 21 moving over a corresponding number of contact dials, and comprises a plurality of plug and socket connections or two way switches or the like for cutting in or out of circuit each pair of rings of contacts for each dial and for cutting in or out of circuit the entire dial. In this manner some of the functions performed by a pair of rings may be omitted by disconnection of the circuit at the selectors 45.

In conjunction with the route indicator (Fig. 2) is a notice or advertisement indicator 56 formed of a plurality of screens adapted to be illuminated by lamps connected in parallel with the route indicating lamps so that at any particular stop or station any notice or advertisement may be illuminated. Alternatively some notices may be connected in parallel with the destination lamp and remain illuminated throughout the journey.

Instead of relying on the making of current in a circuit the device can be operated by the breaking of current but this latter method is not so economical. In the case of insulated sections of rails however, the breaks between adjacent sections may be utilized to actuate the solenoid.

If desired a further rotary switch may be provided to give indications to the driver of the approach of stopping places which is particularly useful in foggy weather, or an audible signal may be connected in parallel with signal 39.

Any number of route indicator diagrams may be operated from the one actuating apparatus and in the case of coupled coaches a suitable connection for the diagram is provided so that corresponding indications must be given on each coach.

The mode of operation of the device is as follows:

Referring to the disclosure of Fig. 1, when the vehicle is at the "home" terminal station, the engagement with contact A' on the part of the proper contact member on the arm 21 will establish a circuit from the trolley wire by conductor 5, resistance 19, contact ring 20, contact A', conductor A2, a test box connection A3, the lamp A4, with a return to the rail R$a$, thus illuminating the lamp indicating the station in question. At the same time, the contact bridge 125 on the arm 21 will engage the contact ring 25 and the upper right hand contact segment 25', thus closing a further circuit through the destination indicator 40, with a further rail return R$a$. Likewise, the contact bridge member 123 on the arm 21 will close a circuit from the contact ring 23 to the upper right hand segment 23', so that current will likewise flow to the front and rear lamps 42, 43 of the vehicle.

After the vehicle leaves the station, a contact element 2, 3 is encountered so that current will flow by conductors 10 and brushes 11, 12 to the contact rings 13, 14 and thence by conductors 15, 16 and resistance 17, solenoid 18 to the rail return R$a$, momentarily energizing the solenoid 18 and producing therewith a momentary movement of its plunger element 30 resulting in a closure of the contact 37 so that current may flow from the resistance 19 through this contact 37 and the audible element 39 back to the rail return R$a$, and the audible alarm sounds momentarily to direct attention to the indicator. Likewise, the movement of the plunger 30 operates through arm 31 to move the ratchet wheel 34 and produce a single step of movement of the arm 21 resulting in the passage of the bridge contact 120 from the station contact element A' onto the next consecutive contact element $a'$ which is a track element. Current now flows as before from the trolley wire 1 to the contact ring 20, but now passes by contact element $a'$ and conductor $a^2$ to energize the lamp $a^4$, which now indicates on the vehicle that the latter is in movement between the station corresponding to indication A$^4$ and the station corresponding to indication B$^4$.

Just before reaching the station corresponding to B$^4$, a further contact element 2, 3 is encountered so that current again flows through the conductors 10 and solenoid 18 in the same circuit as before, with a further energization of the solenoid 18, resulting in a further energization of the audible alarm 39 to call attention to the change of indication; and with a further stepwise movement of the arm 21 resulting in a movement of the contact 120 to engagement with the next succeeding contact B', which is a station contact element. Current will now flow through the same path as before to the ring 20, but now passes by the bridge 120 to the contact element B' and by conductor B$^2$ to the illuminating device B$^4$, so that the indicator now designates the fact that the vehicle is at the station corresponding to B$^4$.

This succession of illumination of station indicator elements and track indicator elements continues until the vehicle reaches its other terminal, wherewith the contact bridge 120 engages the terminal station contact Z' so that current now flows from the contact ring 20 to the station contact element Z' and thence by conductor Z² to the terminal station illuminating means Z⁴. At this moment also, the contact members 125, 124, 123 etc. pass from the upper right hand segment of their respective rings 25', 24', 23' and engage the lowermost segments of the corresponding segment rings, so that now current flows from the contact ring 25 to the lower segment 25' and thence to the destination indicator 41, corresponding to a reversal of direction of movement of the vehicle on its return journey. Likewise, the engagement of the contact 123 with the lower contact segment 23' results in the closing of the head and rear lamps 43', 42' on the vehicle, with the extinguishing of the corresponding lamps 42, 43. The vehicle now indicates that it is ready for a return journey to the "home" station. In succession as this journey is accomplished, the illuminating lamps are energized but in the reverse sequence, by the engagement of the bridge contact 120 with the successive station and track contact elements E*a*, *da*, B*a*, *ca*, etc., until finally the contact 120 closes a circuit to the contact stud A*a*, resulting in a further illumination of the terminal station indicator A⁴ in the manner described above, and also in the closing of a circuit by conductor 39*x* for the energization of the audible alarm 39, and this audible alarm continues to operate until the train attendant moves the knob 55 to rotate the contact arm 21 through an arc corresponding to the angular distance between contacts A*a* and A; whereby the mechanism is reset for a further "out" journey. It will be noted that the successive contact elements for the in and out journey correspond one to another but are arranged in reverse sequence around the circular arc, and that between the contacts representing the beginning of the outward journey and the contacts representing the ending of the "home" journey, a space is left. It will be understood that this space will vary according to the size and number of the contacts in the two groups, and that this space is left for the purpose of facilitating the adaptation of the apparatus to vehicles traveling on fixed routes having a greater or lesser number of stations therealong.

In the form of construction shown in Fig. 3, the same functions are accomplished except that the arc 21 moves through a half revolution instead of substantially a one-third revolution during the "out" journey. Likewise, during the "home" journey, the device of Fig. 3 accomplishes a further one-half revolution resulting in the return of the switch arm 21 to its initial position at the completion of the "home" journey.

The provision of the contacts 11, 12 and rings 13, 14 allow the manipulation of the trolley arm in any direction without breaking of connection, and the shield members 9 without accidental contact of the contacts 6, 7 with the line 1.

It will be appreciated that many varying methods of providing a periodic current for the solenoid or like operating circuit are possible. For example, the controlling circuit may be tapped off at the same voltage as the lighting circuit and a flexible collector carried underneath the vehicle may be adapted to contact at predetermined intervals with a short-circuiting or earthing strip arranged adjacent the track.

Additionally instead of the indicating device being operated on the making or breaking of current it may be operated on neutralization of current. In other words, a current may be flowing through the operating circuit which is neutralized by a current periodically picked up from the source.

Further, instead of utilizing a two window outside destination indication the construction of Fig. 10 may be utilized. This shows an indicator 56ª having a single window 57ª. In front of the window 57ª is a forked lever 58ª carrying at the ends of the forks two rollers 59ª round which is rolled a blind 60ª carrying the two destination names. Operating the lever to move one or other of the names in front of the window 57ª are solenoids 60ᵇ, 61ᵇ, connected to the switch contacts of the respective terminal stations. In this manner the blind 60ª may be moved bodily at the end of each journey and further each individual roller may have a handle to wind the blind about the same for the display of different terminal station names.

I declare that what I claim is:

1. In indicating apparatus for vehicles driven from a source of electric supply the combination of a stationary route indicator diagram having stopping station elements and track elements between said station elements, means to illuminate each of said elements, switch means controlling the operation of said illuminating means, a step by step device to vary said switch and means to connect said step by step device periodically and automatically with said source to cause the successive illumination of said elements.

2. In indicating apparatus for vehicles driven from a source of electric supply the combination of a stationary route indicator diagram having stopping station elements and track elements between said station elements, means to illuminate each of said elements, switch means controlling the operation of said illuminating means, a step by step device to vary said switch means to connect said step by step device periodically and automatically with said source to cause the successive illumination of said elements and means automatically operated by said switch to cause illumination of each terminal station element at the end of each journey until the commencement of the next.

3. In indicating apparatus for vehicles driven from a source of electric supply the combination of a stationary route indicator diagram having stopping station elements and track elements between said station elements, means to illuminate each of said elements, switch means controlling the operation of said illuminating means, a step by step device to vary said switch means to connect said step by step device periodically and automatically with said source to cause the successive illumination of said elements, means automatically operated by said switch to cause illumination of each terminal station element at the end of each journey until the commencement of the next and a destination indicator visible from the outside of the vehicle and adapted to be changed automatically at the completion of each journey.

4. In indicating apparatus for vehicles driven from a source of electric supply the combination of a stationary route indicator diagram having stopping station elements and track elements between said station elements, means to illuminate each of said elements, switch means controlling the operation of said illuminating means, a step by step device to vary said switch means to connect said step by step device periodically and automatically with said source to cause means to illuminate each of said elements, and an advertisement indicator having further illuminating means connected with said illuminating means for said indicating elements and adapted to be illuminated automatically on the illumination of said elements.

5. In indicating apparatus for vehicles driven from a source of electric supply the combination of a route indicator diagram comprising a plurality of routes marked on a flexible screen each route consisting of stopping station elements and track elements, means to illuminate each of said elements, switch means controlling the operation of said illuminating means, a step by step device actuating said switch means, means to connect said device periodically and automatically with said source to cause successive illumination of said elements, a casing for said route diagram having a window and means to move said diagram relatively to said window to vary the route indicated.

6. In an indicator for vehicles driven from a source of electric supply the combination of a stationary route indicator diagram having stopping station elements and track elements between said station elements, means to illuminate each of said elements, switch means controlling the operation of said illuminating means, a step by step device to vary said switch, means to connect said device periodically and automatically with said source to cause the successive illumination of said elements, and a test box having adjustable circuits inserted between said illuminating devices and said switch means to allow adjustment of said indications.

7. Indicating apparatus for tramway cars driven from a source of electric supply and provided with a trolley collecting arm comprising in combination a plurality of indicating elements, means to actuate said elements, switch means controlling the actuation of said elements, a step by step device operating said switch means, auxiliary contact rails placed adjacent said supply line and connected thereto, insulated contacts mounted on said arm and contacting with said contact rails, contact rings mounted adjacent the lower end of said arm, means to connect said rings with said switch operating device, a pair of rubbing contacts mounted in the lower end of said arm and contacting with said rings and means to connect said rubbing contacts with said insulated contacts.

8. In indicating apparatus for vehicles driven from a source of electric supply the combination of a stationary route indicator having stopping station elements and track elements between said station elements, means to illuminate each of said elements, switch means controlling the operation of said illuminating means, a step-by-step device to vary said switch, means to connect said step-by-step device periodically and automatically with said source to cause the successive illumination of said elements, and an advertisement indicator having further illuminating means connected with said illuminating means for said indicating elements and adapted to be illuminated or extinguished simultaneously with certain of said indicating elements.

9. In indicating appartus for vehicles, the combination of a route indicator diagram having station elements and track elements thereon arranged to indicate in sequence the route being followed, individual means to illuminate said elements, switch means including a contact stud for each of said illuminating means to control the lighting thereof, connections between said contacts and illuminating means, a step-by-step device to move said switch means to select said contact studs, and means to actuate said step-by-step device including members fixed along the right-of-way, so that said actuating means is operated at each succeeding station along the route when the vehicle reaches the station whereby said switch selects for energization the respective illuminating means to illuminate the corresponding station element, and when the vehicle leaves the station to cause the switch to extinguish the said first selected illuminating means and to select for energization the next succeeding illuminating means to illuminate the corresponding track element.

10. In indicating apparatus for vehicles, the combination of a route indicator diagram having stopping station elements and track elements thereon arranged to indicate in sequence the route being followed, individual means to illuminate said elements, a contact ring and a plurality of contact studs arranged in sequence and spaced from said ring, a switch arm adapted to move along said contact ring and pass said contact studs in succession, a bridge plate on the arm to establish connection with said ring and with a selected one of said contact studs, individual connections between said contact studs and said individual illuminating means, and a step-by-step device to move said switch arm whereby the contact studs are selected in succession.

11. An indicating apparatus as in claim 10, in which the switch arm carries a second bridge plate, and a pair of contact segments each extending concentrically with the second contact ring for an angular distance equal to the angular separation between the contact studs corresponding to the "home" and "out" terminal stations, destination indicating devices, and means connecting said contact segments and said destination indicating devices and operated by energization so that by energization of the respective segment through the said second bridge plate, the destination indicator corresponding to the route being traveled will be energized.

12. Indicating apparatus comprising a plurality of groups of indicators, a rotatable arm formed of insulating material, step-by-step means for rotating said arm, a bridging device on said arm for each group of indicators, an arcuate contact member for each bridging device adapted for continuous contact therewith over a given range of movement thereof, a source of electric supply adapted to be connected to each contact member and a series of contact elements for each group of indications, each series being arranged concentric with said contact members and the elements of each series being adapted for successive connection with one of said contact members by a bridging device.

13. Indicating apparatus comprising a plurality of indications, electrical illuminating means for each of said indications, a source of electric supply, a rotatable arm formed of insulating material, step-by-step means for rotating said arm, an electrical bridging device on said arm, a contact member connected with said source and adapted for continuous contact with said bridging device over a given amplitude of movement of said arm and a plurality of contact elements each connected with one of said illuminating means and adapted for successive contact with said bridging device on said arm.

14. Indicating apparatus comprising a plurality of groups of indications, corresponding groups of electrical illuminating means for said indications, a source of electric supply, a rotatable arm formed of insulating material, step-by-step means for rotating said arm, an electrical bridging device on said arm for each of said groups of illuminating means, contact members connected with said source, each adapted for continuous contact with one of said bridging devices over a given amplitude of movement of said arm and groups of contact elements, each element of a group being connected with one of said illuminating means of a group and adapted for successive contact with said bridging device.

In witness whereof, I have hereunto signed my name this 17th day of April, 1925.

JAS. McCREATH.